United States Patent Office 2,750,396
Patented June 12, 1956

2,750,396
PRODUCTION OF CHLORINATED POLYCYCLIC ALCOHOLS

Henry G. Fechter, Morton Kleiman, and Arthur Goldman, Chicago, Ill., assignors to Velsicol Chemical Corporation, a corporation of Illinois No Drawing. Application October 6, 1952, Serial No. 313,358

4 Claims. (Cl. 260—410)

This invention relates to the preparation of novel chlorinated polycyclic alcohols. More specifically, this invention relates to the chlorohydrin derivatives of 4,5,6,7,8,8-hexachloro-3a,4,7,7a-tetrahydro-4,7-methanoindene. The products of the present invention have the following structure:

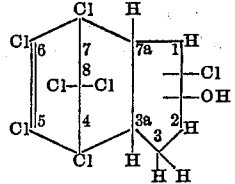

As indicated, the chlorine atom can be either at the number 1 position or the number 2 position. The hydroxyl group then assumes the remaining position. Thus, there are two possible positional isomers.

When the chlorine atom is in the 1 position, the material is termed 1,4,5,6,7,8,8-heptachloro-2-hydroxy-3a,4,7,7a-tetrahydro - 4,7 - methanoindane. When the chlorine atom is in the 2 position, the material is termed 1-hydroxy-2,4,5,6,7,8,8-heptachloro - 3a,4,7,7a - tetrahydro-4,7-methanoindane.

A chlorohydrin as above shown may be prepared by reacting 4,5,6,7,8,8-hexachloro - 3a,4,7,7a-tetrahydro-4,7-methanoindene with tertiary butyl hypochlorite in the presence of an organic acid followed by hydrolysis of the intermediate ester formed. A specific example of this method is herewith presented.

The starting material 4,5,6,7,7,8-hexachloro-3a,4,7,7a-tetrahydro-4,7-methanoindene was prepared by reacting hexachlorocyclopentadiene and cyclopentadiene to form the Diels-Alder adduct of said reactants, in accordance with the Herzfeld et al. Patent 2,606,910.

Example 1

Glacial acetic acid (60 ml.) and 4,5,6,7,8,8-hexachloro-3a,4,7,7a-tetrahydro-4,7-methanoindene (17.0 g.; 0.05 mol) were placed in a flask and heated with stirring to 75° C. t-Butyl hypochloride (97%; 11.0 g.; 0.1 mol) was slowly added over a fifteen-minute period. The reaction mixture was stirred for an additional 45 minutes while maintaining the temperature at about 75°–85° C. At the end of this period a titration of a 1 ml. aliquot of the reaction mixture with sodium thiosulfate indicated the reaction was substantially complete. The reaction mixture was cooled and a crystalline precipitate was isolated by filtration. These crystals were washed with water, dried, and recrystallized from benzene. The thus purified intermediate product melted at 164°–166° C. and by chemical analysis was shown to be the acetate derivative of the desired chlorohydrin.

|   | Analysis of Crystals | Calculated for $C_{12}H_9Cl_7O_2$ |
|---|---|---|
|   | Percent | Percent |
| C | 33.31 | 33.25 |
| H | 2.05 | 2.09 |
| Cl | 57.44 | 57.27 |

The acetate derivative above described (2.0 g.) was added to methanol (25 g.) saturated with dry HCl. The mixture was heated at reflux for two hours after which time the excess methanol was removed by distillation. The residue was dissolved in ether and washed with water and sodium bicarbonate solution. The ether solution was then dried and the solvent removed by evaporation. The residue was crystallized from heptane. The thus purified product which was the desired chlorohydrin derivative melted at 99°–102° C. Its chemical analysis was as follows:

|   | Analysis of Product | Calculated for $C_{10}H_7Cl_7O$ |
|---|---|---|
| C | 30.57 | 30.66 |
| H | 1.82 | 1.80 |
| Cl | 63.37 | 63.41 |

The process shown in Example I is specific. Obviously many variations of the process therein disclosed can be used. Thus, the reaction proceeds satisfactorily with an excess of organic acid as the only solvent, but other nonreactive solvents may be added if desired.

The organic acid used may be different from that shown in the example. Acids having a relatively low molecular weight, such as acetic, propionic or butyric acid, are preferred; however, higher acids such as those containing from about five to about fourteen carbon atoms may also be used in the presence of a solvent. The intermediate ester formed is that of the chlorohydrin and the acid utilized.

The ester formed as an intermediate need not be purified prior to subjecting it to hydrolysis to form the chlorohydrin. Such hydrolysis can be accomplished in aqueous media using a strong base such as KOH or NaOH as catalyst. More preferred, such hydrolysis may be accomplished by transesterification, utilizing a lower alcohol such as methanol, ethanol, propanol, etc.

The temperature of reaction for the process shown in Example I may vary. Thus, in the first step to produce the ester, the reaction may be carried out at a temperature between about 20° and about 150° C. The formation of the chlorohydrin from the ester by transesterification may be carried out at a temperature between about 50° to about 150° C. If aqueous hydrolysis is used, a most convenient temperature is the boiling point of water.

The ratio of reactants is not critical. However it is preferred that an excess of organic acid be used in the formation of the ester derivative. An excess of hypochlorite is also preferred.

The chlorohydrin of 4,5,6,7,8,8-hexachloro-3a,4,7,7a-tetrahydro-4,7-methanoindene shown in Example I melts at about 100° C. A second chlorohydrin of said indene melting at about 135° C. can be prepared from the glycol of said indene as specifically shown in Example II.

Example II 1,2-dihydroxy - 4,5,6,7,8,8 - hexachloro - 4,7 - methano-3a,4,7,7a-tetrahydroindane (M. P. 139° C.; 16.9 g.; 0.045 mol) was dissolved in pyridine (9.5 g.; 0.12 mol) contained in a 3-necked flask equipped with a stirrer, condenser $CaCl_2$ drying tube, and dropping funnel. Thionyl chloride (16.1 g.; 0.135 mol) was added dropwise while maintaining the temperature below 40° C. After addition was complete, the reaction mixture was heated to 130° C. to drive off $SO_2$ formed. This heating was continued for three hours, after which time the mixture was cooled and an excess of hydrochloric acid was added to decompose unreacted $SOCl_2$. The mixture was further diluted with water and then extracted with a total of 200 ml. of benzene in several portions.

The extract was successively washed with water, 5% $NaHCO_3$ solution, and again with water, and then dried over anhydrous $Na_2CO_3$. The benzene solution was then decolorized by treatment with activated charcoal. This solution was concentrated by evaporation and the desired product was crystallized from hexane. The crystalline chlorohydrin product was purified by recrystallization from hexane. The substantially pure material had a melting point of 135.0°–135.5° C. Its chemical analysis was as follows:

|    | Analysis of Product | Calculated for $C_{10}H_7Cl_7O$ |
|----|----|----|
| C  | 30.74 | 30.69 |
| H  | 1.85  | 1.80  |
| Cl | 63.74 | 63.42 |

The process described in Example II is unusual in that the chlorinating reagent reacts specifically with only one of the hydroxyl groups in the glycol starting material. Thus, the reaction unexpectedly produces the chlorohydrin rather than the expected dichloro derivative.

The compounds of the present invention are valuable insecticides and are useful in the control of such household insects as German roaches.

The compounds of the present invention also possess superior insecticidal activity to a wide variety of other insect pests, including those important in agriculture. They may be utilized and applied as a sole active ingredient dispersed in carriers such as dusts, solvents, aqueous dispersions, or other carriers frequently used in the art. In addition, the compounds of the present invention can be used in combination with other insecticides or fungicides.

We claim as our invention:

1. The 1,2-chlorohydrin derivative of 4,5,6,7,8,8-hexachloro-3a,4,7,7a-tetrahydro-4,7-methanoindene.
2. The product of claim 1 having a melting point of about 99°–102° C.
3. The product of claim 1 having a melting point of about 135° C.
4. The carboxylic acid ester of the product of claim 1, said acid being an aliphatic saturated hydrocarbon carboxylic acid containing less than fifteen carbon atoms.

References Cited in the file of this patent

UNITED STATES PATENTS

| 2,528,654 | Herzfeld | Nov. 7, 1950 |
| 2,678,898 | Buntin   | May 18, 1954 |